United States Patent
Nie et al.

(10) Patent No.: US 11,468,578 B2
(45) Date of Patent: Oct. 11, 2022

(54) SYSTEMS AND METHODS FOR VIDEO-BASED SPORTS FIELD REGISTRATION

(71) Applicant: Amazon Technologies, Inc., Seattle, WA (US)

(72) Inventors: Xiaohan Nie, Lynnwood, WA (US); Muhammad Raffay Hamid, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 26 days.

(21) Appl. No.: 16/948,348

(22) Filed: Sep. 14, 2020

(65) Prior Publication Data
US 2022/0084222 A1 Mar. 17, 2022

(51) Int. Cl.
*G06T 7/33* (2017.01)
*G06T 7/73* (2017.01)
(Continued)

(52) U.S. Cl.
CPC ............ *G06T 7/337* (2017.01); *G06K 9/6254* (2013.01); *G06K 9/6256* (2013.01); *G06K 9/6261* (2013.01); *G06K 9/6263* (2013.01); *G06T 7/73* (2017.01); *G06V 10/751* (2022.01); *G06V 20/46* (2022.01); *H04N 5/272* (2013.01); *G06T 2207/10016* (2013.01);
(Continued)

(58) Field of Classification Search
None
See application file for complete search history.

(56) References Cited

U.S. PATENT DOCUMENTS

| 8,457,357 | B2 * | 6/2013 | Foote | G06T 7/70 |
| | | | | 382/103 |
| 8,599,317 | B2 * | 12/2013 | Shamur | G11B 27/036 |
| | | | | 386/280 |

(Continued)

FOREIGN PATENT DOCUMENTS

| EP | 2287806 A1 * | 2/2011 | ............... G06T 7/80 |
| EP | 2597613 A1 * | 5/2013 | ............. G06T 7/004 |
| WO | WO-2016168085 A1 * | 10/2016 | ............. G06T 7/292 |

OTHER PUBLICATIONS

BBC Research & Development, "Piero sports graphics system: Putting a new perspective on sport,", Webpage <https://www.bbc.co.uk/rd/projects/piero> Downloaded Sep. 18, 2020, 6 pages.
(Continued)

*Primary Examiner* — Anand P Bhatnagar
(74) *Attorney, Agent, or Firm* — Weaver Austin Villeneuve & Sampson LLP

(57) ABSTRACT

Methods and systems are described for registering a sports field to a video. Video of a live event may feature participants at a venue. A template of the venue, including virtual markings that represent real markings on the venue, may be obtained. A homographic transformation between an image plane and a ground plane may be determined by matching virtual markings to corresponding real markings captured in at least one frame of the video. The determined homographic transformation may be used in the automated analysis of sports statistics and in improving inserted annotations and visualizations.

18 Claims, 7 Drawing Sheets

(51) Int. Cl.
| | |
|---|---|
| G06V 20/40 | (2022.01) |
| G06V 10/75 | (2022.01) |
| G06K 9/62 | (2022.01) |
| H04N 5/272 | (2006.01) |
| H04N 21/2187 | (2011.01) |
| H04N 21/234 | (2011.01) |

(52) U.S. Cl.
CPC .............. *G06T 2207/20021* (2013.01); *G06T 2207/20081* (2013.01); *G06T 2207/20092* (2013.01); *G06T 2207/30204* (2013.01); *G06T 2207/30228* (2013.01); *H04N 21/2187* (2013.01); *H04N 21/23418* (2013.01)

(56) References Cited

U.S. PATENT DOCUMENTS

| | | | | |
|---|---|---|---|---|
| 8,805,007 | B2* | 8/2014 | Zhang | G06T 7/74 382/103 |
| 8,959,555 | B2* | 2/2015 | Monari | H04N 21/6106 725/62 |
| 9,303,525 | B2 | 4/2016 | Aerts et al. | |
| 9,883,163 | B2* | 1/2018 | Carr | G06T 7/85 |
| 10,284,794 | B1 | 5/2019 | Francois et al. | |
| 10,600,210 | B1 | 3/2020 | Citraro et al. | |
| 10,706,566 | B2* | 7/2020 | Perry | G06T 7/292 |
| 2010/0238351 | A1* | 9/2010 | Shamur | H04H 60/37 348/E5.062 |
| 2011/0150275 | A1 | 6/2011 | Tong et al. | |
| 2013/0114851 | A1* | 5/2013 | Foote | G06T 7/77 382/103 |
| 2013/0128034 | A1* | 5/2013 | Carr | G06T 7/254 348/135 |
| 2016/0358634 | A1 | 12/2016 | Molgaard et al. | |
| 2018/0075593 | A1* | 3/2018 | Wang | G06T 7/85 |
| 2018/0336704 | A1* | 11/2018 | Javan Roshtkhari | G06T 7/13 |
| 2020/0334838 | A1* | 10/2020 | Perry | G06T 7/292 |

OTHER PUBLICATIONS

Chen, et al., "A two-point method for ptz camera calibration in sports" *2018 IEEE Winter Conference on Applications of Computer Vision (WACV)*, pp. 287-295, 2018.
Dalal, et al., "Histograms of oriented gradients for human detection" *2005 IEEE Computer Society Conference on Computer Vision and Pattern Recognition*, 2005.
Eshel, et al., "Homography based multiple camera detection and tracking of people in a dense crowd" *2008 IEEE Conference on Computer Vision and Pattern Recognition*, pp. 1-8, 2008.
Gander, et al., "Least-squares fitting of circles and ellipses" *BIT Numerical Mathematics*, 34(4):558-578, 1994.
Hamid, et al., "Player localization using multiple static cameras for sports visualization" *2010 IEEE Computer Society Conference on Computer Vision and Pattern Recognition*, pp. 731-738, 2010.
Hartley, et al., "Multiple view geometry in computer vision" Cambridge University Press, 2003.
Hess, et al., "Improved video registration using non-distinctive local image features" *2007 IEEE Conference on Computer Vision and Pattern Recognition*, pp. 1-8, 2007.
Hess, Robin W., "Toward computer vision for understanding american football in video" *Dissertation, Oregon State University*, Jun. 14, 2012.
Homayounfar, et al., "Sports field localization via deep structured models" *Proceedings of the IEEE Conference on Computer Vision and Pattern* Recognition, pp. 5212-5220, 2017.
Intille, Stephen Sean, "Tracking using a local closed-world assumption: Tracking in the football domain" *PhD thesis, Massachusetts Institute of Technology*, 1994.
Khan, et al., "A multiview approach to tracking people in crowded scenes using a planar homography constraint" *European Conference on Computer Vision*, pp. 133-146, Springer, 2006.

Kim, et al., "Motion fields to predict play evolution in dynamic sport scenes" *2010 IEEE Computer Society Conference on Computer Vision and Pattern Recognition*, pp. 840-847, 2010.
Kim, et al., "Multi-camera tracking and segmentation of occluded people on ground plane using search-guided particle filtering" European Conference on Computer Vision, pp. 98-109, Springer, 2006.
Lake, Matt, "When the Game's on the Line, the Line's on the Screen" *NY Times*, 2000.
Li, et al., "Deep visual tracking: Review and experimental comparison" *Pattern Recognition*, 76:323-338, 2018.
Lu, et al., "Pan-tilt-zoom slam for sports videos" arXiv preprint arXiv:1907.08816, 2019.
Okuma, et al., "Automatic rectification of long image sequences" *Asian Conference on Computer Vision*, vol. 9, 2004.
"Piero Broadcast" Ross Living Live, Brochure, 2020, 10 pages.
"Piero Live" Ross Living Live, Brochure, 2020, 8 pages.
"Piero Sports Graphics Analysis" Ross Living Live, Webpage <https://www.rossvideo.com/products-services/acquisition-production/cg-graphics-systems/piero-sports-graphics-analysis/>, Downloaded Sep. 18, 2020, 10 pages.
Sharma, et al., "Automated top view registration of broadcast football videos" *2018 IEEE Winter Conference on Applications of Computer Vision (WACV)*, pp. 305-313, 2018.
St. John, Allen, "The Billion Dollar Game: Behind the Scenes of the Greatest Day in American Sport-Super Bowl Sunday" *Anchor*, 2009.
Szenberg, et al., "Automatic camera calibration for image sequences of a football match" *Proceedings of the International Conference on Advances in Pattern Recognition*, pp. 303-312, Springer, 2001.
Thomas, G.A., "Real-Time Camera Tracking using Sports Pitch Markings," British Broadcasting Corporation, WHP 168, Jul. 2008, 25 pages.
Wen, et al., "Court Reconstruction for Camera Calibration in Broadcast Basketball Videos" *IEEE Transactions on Visualization and Computer Graphics*, 22(5):1517-1526, 2015.
Xiao, et al., "End-to-end deep learning for person search" arXiv preprint arXiv:1604.01850, 2:2, 2016.
Yang, et al., "Recent advances and trends in visual tracking: A review" *Neurocomputing*, 74(18):3823-3831, 2011.
Loquercio, et al.,"A General Framework for Uncertainty Estimation in Deep Learning" IEEE Robotics Automation Letters, arXiv:1907.06890v4, 10 Pages. 2020.
Cao, et al., "Realtime Multi-Person 2D Pose Estimation using Part Affinity Fields", The Robotics Institute, Carnegie Mellon University, arXiv:1611.08050v2, 9 pages. 2017.
DeTone, et al., "Deep Image Homography Estimation".
He, et al., "Deep Residual Learning for Image Recognition", Microsoft Research, arXiv:1512.03385v1, 2015, 12 pages.
Lowe, et al., "Distinctive Image Features from Scale-Invariant Keypoints", International Journal of Computer Vision, 2004, 28 pages.
Newell, "Stacked Hourglass Networks for Human Pose Estimation", University of Michigan, arXiv:1603.06937v2, 2016, 17 pages.
Jiang, et al., "Optimizing Through Learned Errors for Accurate Sports Field Registration", arXiv:1909.08034v2, 2020, 10 pages.
Rublee, et at., "ORB: an efficient alternative to SIFT or SURF", 8 Pages.
Fischler, et al. "Random Sample Consensus: A Paradigm for Model Filling with Applications to Image Analysis and Automated Cartography", Communication of the ACM, vol. 24, No. 6, 1981, 15 pages.
Citraro, et al., "Real-Time Camera Pose Estimatation for Sports Fields", arXiv:2003.14109v1, 2020, 12 pages.
Chen, et al., "Rethinking Atrous Convolution for Semantic Image Segmentation", Google Inc., arXiv:1706.05587v3 2017, 14 pages.
Lakshminarayanan, et al., "Simple and Scalable Predictive Uncertainty Estimation using Deep Ensembles", 31sr Conference on Neural Information Processing Systems, 2007, 15 pages.
Jaderberg, et al., "Spatial Transformer Networks", arXiv:1506.02025v3 2016, 15 pages.
Chen, et al., "Sports Camera Calibration via Synthetic Data", arXiv:18110.10658v1, 2018, 7 pages.

(56) References Cited

OTHER PUBLICATIONS

Schonberger, et al., "Structure-from-Motion Revisited".
Ronneberger, et al., "U-Net: Convolutional Networks for Biomedical Image Segmentation", arXiv:1505.04597v1, 2015, 8 pages.
Nguyen, et al., "Unsupervised Deep Homography: A Fast and Robust Homography Extimation Model", arXiv:1709.03966v3, 2008, 8 pages.
Dutta, et al., "VGG Image Annotator (VIA)", 5 pages.
U.S. Appl. No. 16/738,581, filed Jan. 9, 2020, Hamid et al.
US ExParte Quayle Office Action dated Jul. 24, 2020 issued in U.S. Appl. No. 16/738,581.
U.S. Notice of Allowance dated Aug. 19, 2020 issued in U.S. Appl. No. 16/738,581.
International Search Report and Written Opinion dated Dec. 22, 2021, in PCT Application No. PCT/US2021/048680.

\* cited by examiner

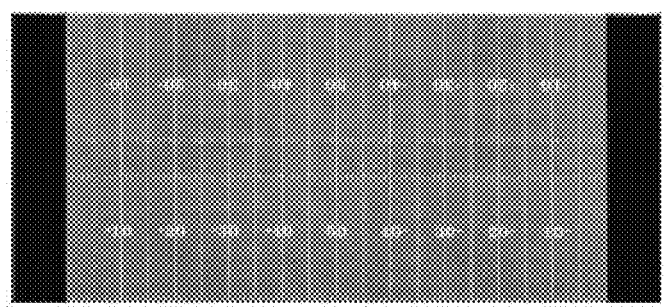
FIG. 5A
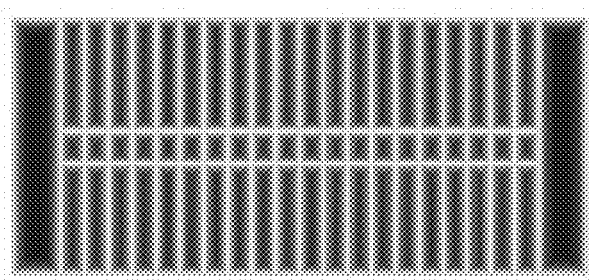 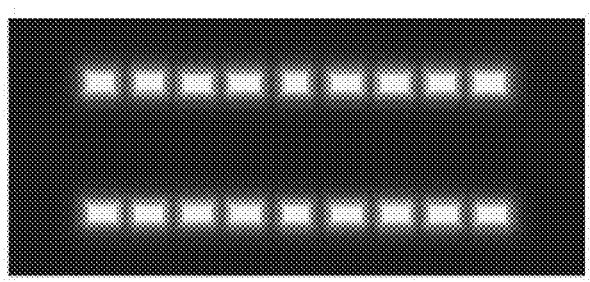
FIG. 5B    FIG. 5C

SYSTEMS AND METHODS FOR VIDEO-BASED SPORTS FIELD REGISTRATION

BACKGROUND

Replays and highlights of sporting events are often analyzed for sports statistics and modified to include visualizations, such as a virtual circle that follows a particular player of interest during a play. However, analyzing videos and adding visualizations is time-consuming and generally relies on complex human contributions (e.g., a human carefully drawing or animating a circle that follows a particular player on each video frame). Previous attempts to automate analysis for sports statistics and insertion of visualizations have had substantial limits such as requiring human input, static cameras, and/or a large field-of-view of the sports field, and thus are not practical in many scenarios.

BRIEF DESCRIPTION OF THE DRAWINGS

FIG. 5A illustrates an example of a sports field template for American football.

FIG. 5B illustrates examples of ground truth line features in an American football field.

FIG. 5C illustrates examples of ground truth region features in an American football field.

DETAILED DESCRIPTION

This disclosure describes techniques for determining sports field registration from video. Broadcast footage is analyzed to determine what homographic transformations occur, for any given frame of the video, between an image plane defined by the broadcast camera and a ground plane defined by the playing field. The techniques enable the determination of homographic transformations between the image and ground planes, even as the camera undergoes pan, tilt, and zoom (PTZ) motion (e.g., even when the homographic transformations change during the video). Using the determined homographic transformation information, sports videos can be analyzed to determine sports statistics, improved visualizations can be added to videos, and other benefits may be realized. This may be understood with reference to the example shown in FIGS. 1A and 1B, which provides a high-level depiction of an implementations enabled by the present disclosure for determining sports field registration from video.

Figure 1A:
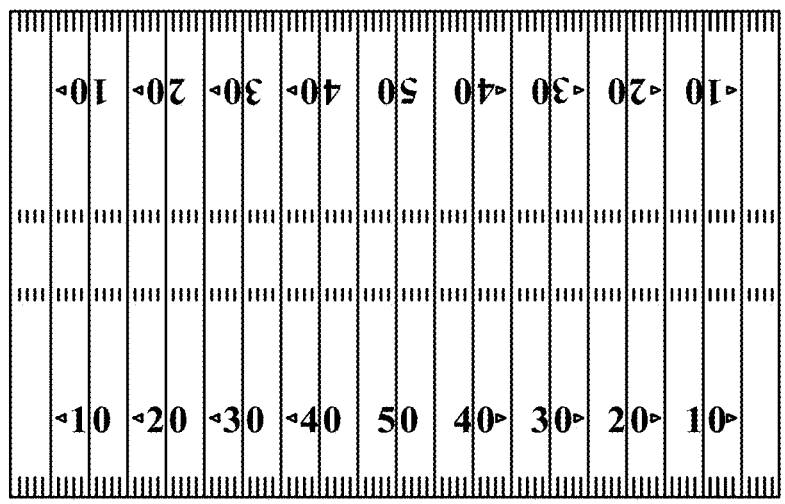
FIG. 1A illustrates an example of a sports field template for American football.
Figure 1B:
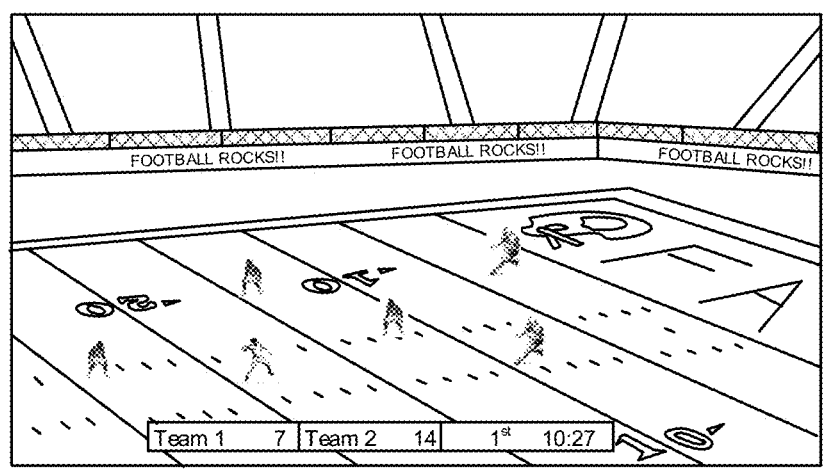
FIG. 1B illustrates an example of an image frame in a sports broadcast.

As shown in FIG. 1A, sporting events are typically played on a sports field (e.g., a ground plane). However, most videos of sporting events are captured by a camera positioned off to the side of the action as shown in FIG. 1B, rather than being positioned directly overhead. Additionally, the exact position of the camera is often unknown, various properties of the camera such as focal length are often unknown, and the camera often undergoes pan, tilt, and/or zoom motion during a video. All of these factors make it difficult to convert the positions of points or objects in multiple frames of the sports video to positions of those points or objects on the sports field (e.g., on the ground plane) and vice-versa. Additionally, it is often desirable to rapidly determine how to convert between the perspective of the video and the ground plane (e.g., as part of analysis, replays, and other activities that occur during a live sporting event). The present disclosure provides techniques for automatically, or semi-automatically, determining the homographic transformations between a playing field seen in a sport video and a top-down template of the same playing field, for some or all of the frames of the sports video.

The determined homographic transformations can be used for various purposes. As nonlimiting examples, the determined homographic transformations can be used to analyze videos and extract certain sports statistics, can be used to insert ground-plane-aware visualizations, and perform other tasks. The extraction of sports statistics from videos could include, as an example, tracking the movement of a player within the ground plane over time to measure the total distance the player travels. The insertion of ground-plane-aware visualizations could include, as an example, drawing a circle on the ground plane at a player's location, and then shearing and skewing that circle such that the resulting visualization looks geometrically plausible to viewers (e.g., to make it look as if there were actually a circle drawn on the ground plane). Additional techniques for insertion of ground-plane-aware visualizations are described in U.S. patent application Ser. No. 16/738,581, filed Jan. 9, 2020, which is incorporated herein by reference in its entirety and for all purposes.

Figure 2:
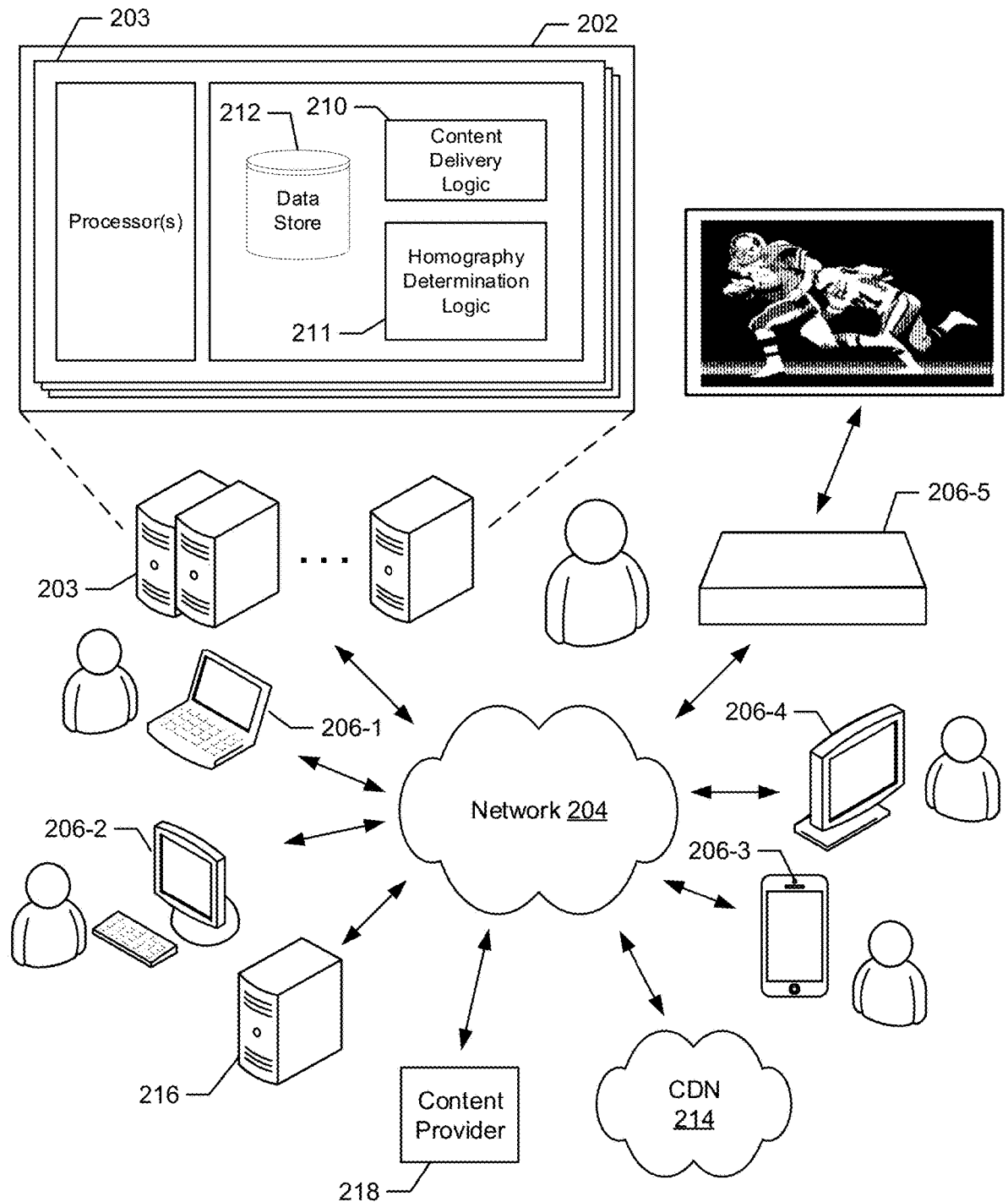
FIG. 2 illustrates an example of a computing environment in which implementations enabled by the present disclosure may be practiced.

FIG. 2 illustrates an example of a computing environment in which a video content service 202 provides video content via network 204 to a variety of client devices (206-1 through 206-5) in accordance with the techniques described herein. The video content may include live or broadcast content or video-on-demand (VOD) content. In various implementations, the video content may be a video presentation of a live event (e.g., a livestream, broadcast, and/or camera feed of an ongoing live event and/or a recording of a partially or fully-completed event which may also be referred to as formerly-live event). Content service 202 may conform to any of a wide variety of architectures such as, for example, a services platform deployed at one or more co-locations, each implemented with one or more servers 203. Network 204 represents any subset or combination of a wide variety of network environments including, for example, TCP/UDP over IP-based networks, unicast/multicast/broadcast networks, telecommunications networks, wireless networks, satellite networks, cable networks, public networks, private networks, wide area networks, local area networks, the Internet, the World Wide Web, intranets, extranets, and so on. Client devices 206 may be any suitable device capable of connecting to network 204 and consuming content provided by service 202. Such devices may include, for example, mobile devices (e.g., cell phones, smart phones, and tablets), personal computers (e.g., laptops and desktops), set top boxes (e.g., for cable, satellite, and online systems), smart televisions, digital assistant devices, gaming consoles, wearable computing devices (e.g., smart watches or smart glasses), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 202 is described as if it is integrated with the platform(s) that provides both broadcast content and VOD-style content to client devices. However, it will be understood that content service 202 may provide access to content in conjunction with one or more content delivery networks (e.g., CDN 214) that may or may not be independent of content service 202. In addition, the source(s) of one or both of the broadcast and VOD-style content may or may not be independent of content service 202 (e.g., as represented by content provider server 216, and live content provider 218). The range of variations known to those of skill in the art are contemplated to be within the scope of this disclosure.

Some of the implementations enabled by the present disclosure contemplate logic resident on the client devices consuming video content from content service 202; such logic might be configured to handle, for example, requesting smaller chunks of subtitle files. Such logic might be part of an existing algorithm or module on the client device or implemented to work in conjunction with such an algorithm or module.

It should also be noted that implementations are contemplated in which, in addition to content delivery logic 210 (which facilitates various aspects of content delivery to client devices 206), content service 202 may include other types of logic, e.g., homography determination logic 211 that facilitates the determination of homographic transformation parameters that represent a homographic transformation between an image plane and a ground plane. In addition to providing access to video content, content service 202 may also include a variety of information related to the video content (e.g., non-burned-in subtitle information, and other associated metadata and manifests in data store 212 to which service 202 provides access). Alternatively, such information associated with and/or about the content, as well as the content itself may be provided and/or hosted by one or more separate platforms, e.g., CDN 214. It should be noted that, while logic 210 and 211, and data store 212 are shown as integrated with content service 202, implementations are contemplated in which some or all of these operate remotely from the associated content service, and/or are under the control of an independent entity. From these examples, those of skill in the art will understand the diversity of use cases to which the techniques described herein are applicable.

Figure 3:
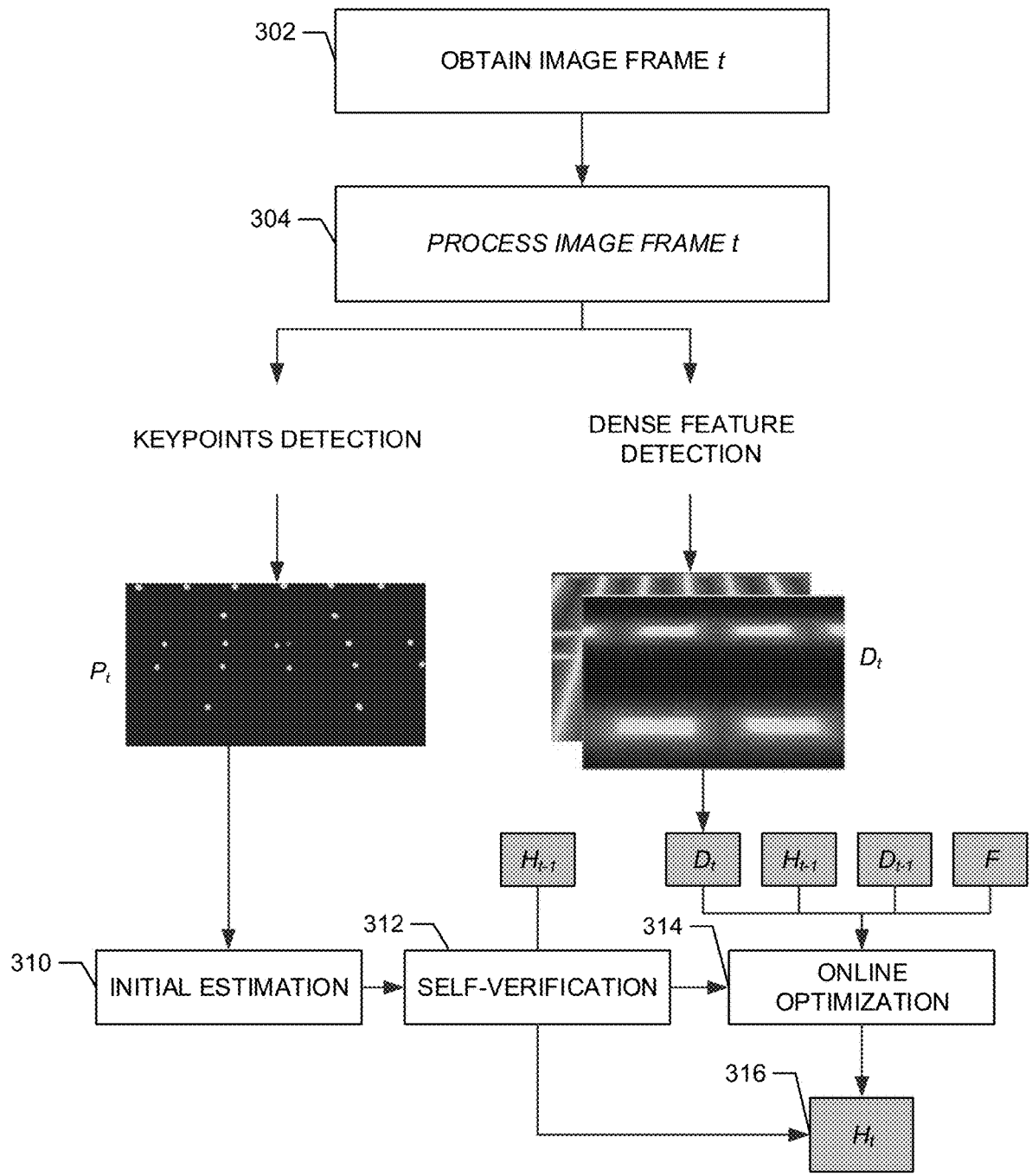
FIG. 3 is a flowchart illustrating operation of a particular class of implementations of homography estimation enabled by the present disclosure.

FIG. 3 illustrates a flowchart for estimating homography, e.g., estimating homographic transformation parameters that represent transformation between an image plane and an ground plane.

In a class of implementations, estimating homography includes, at step 302, obtaining an image frame t. The content may be obtained from an ongoing broadcast, from a recording of an earlier broadcast, or from another content source such as a video-on-demand library. While many of the examples discussed herein are in the context of American football, the techniques disclosed herein may be used in applying ground plane aware visualizations in video of any type, including different videos of different sports and non-sports videos.

In some implementations, at step 304, the image frame t may be processed to detect keypoints and dense features. As an example, the image frame t may be processed through an algorithm employing machine learning (e.g., an artificial neural network). The algorithm may be trained to identify and locate keypoints $P_t$ and dense features $D_t$ that are visible within the image frame t. The algorithm may be generalized and capable of processing a variety of field templates or may be specialized for a given field template (e.g., a template for a particular sport, a template for a particular playing field, etc.). Further details of neutral network training are discussed in connection with FIG. 7. In at least some semi-automated implementations, human input may be received to confirm the accuracy of automatically identified and located keypoints $P_t$ and dense features $D_t$. The output of the neural network may include the coordinates and identities of keypoints $P_t$ visible in the image frame t and the coordinates and identities of dense features $D_t$ visible in the image frame t. The identity of a keypoint visible in the image frame t indicates which keypoint in a field template corresponds to the keypoint visible in the image frame t. Similarly, the identity of a dense feature visible in the image frame t indicates which dense feature in the field template corresponds to the dense feature visible in the image frame t. The coordinates of a keypoint (or dense feature) refers to the spatial position of that keypoint (or the dense feature) within the image frame t. As an example, the coordinates may be x, y coordinates within the image frame t.

Figures 4A, 4B:
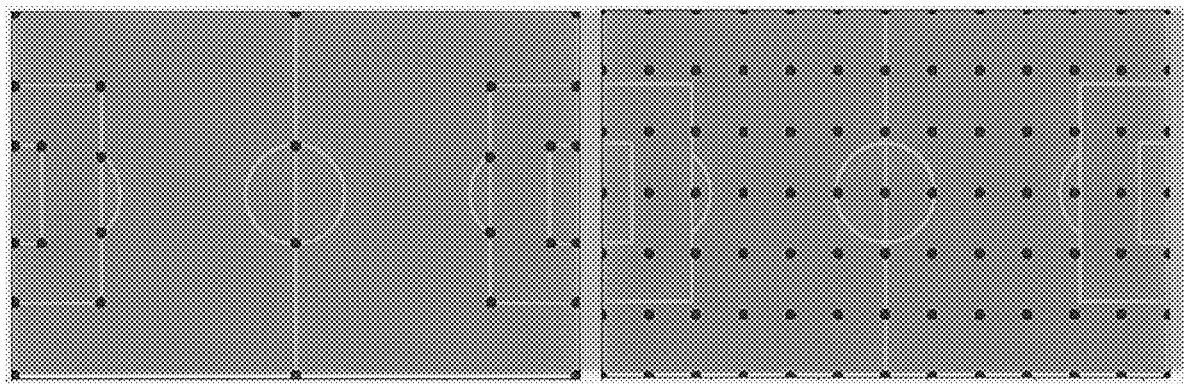
FIG. 4A illustrates an example of keypoints located on corners and intersections of field lines of a soccer field.
FIG. 4B illustrates an example of keypoints uniformed across a soccer field.

The keypoints may be points of interest on a sports field, as shown in the field template of FIG. 4A, or may be points that are uniformly distributed (or distributed according to some pattern or formula) across a playing field, as shown in the field template of FIG. 4B. The present disclosure generally contemplates the use of uniformly distributed keypoints, although keypoints based on points of interest (e.g., field markings, intersections of field markings, etc.) may be used in addition or instead of uniformly distributed keypoints. In general, keypoints distributed relatively uniformly across the field is believed to be beneficial, as it reduces the chance that all keypoints in an image frame are occluded by players. As an example, a zoomed-in image frame of a soccer match might not include any field markings (as soccer fields include few field markings). In such an instance, keypoints distributed relatively uniformly across the field are generally preferred, as doing so significantly increases the likelihood of there being multiple keypoints visible in each image frame, which in turn increases the accuracy of the determined homography. Although distributed keypoints may not be noticeable locally, such keypoints can still be detected with good accuracy by a neural network because of a relatively large receptive field (e.g., the area that the neural network considers as part of determining whether a pixel is part of a keypoint).

The dense features may be line markings and/or distinctive regions on the playing field. In the example of an American football field as shown in FIGS. 5A-5C, the dense features may include line markings such as (1) the hash marks that mark off one yard increments (shown in FIG. 5B), (2) the inbound lines that mark the boundary of the playing field, and (3) yard lines that mark off five yard increments (shown in FIG. 5B). The dense features may also include distinctive regions such as (i) numerals that display the distance from the closest goal line in multiples of ten (outlines of which are shown in FIG. 5C), (ii) arrows adjacent to the numerals to indicate direction to the closest goal line, and (iii) logos of the team, sponsor, league or other entity. Other sports may have different line markings and/or distinctive regions. A soccer pitch, for example, typically includes only a small number of line markings such as the goalie boxes, penalty boxes, penalty arcs, center circle, and corner arcs.

In some implementations, at step 310, an initial estimation of homography $H_t$ for image frame t between an image plane and a ground plane can be determined based on the keypoints $P_t$ identified in step 304. The initial estimation of the homography (e.g., initial estimation of parameters in a homography matrix) may be made, as an example, using random sample consensus (RANSAC) with direct linear transformation (DLT). Other techniques, such as non-linear optimization may also be used. The image plane may refer to the plane of the camera lens (e.g., the plane of the display in FIG. 1B), while the ground plane may refer to the surface of the playing field (e.g., as seen in the field template of FIG. 1A). The homography between the image plane and the ground plane refers to the transformations that occur between the image plane and the ground plane, due to the camera not being directly above and centered with respect to the playing field. In other words, when the homography between an image plane and a ground plane is determined, points on the image plane can be projected onto the correct corresponding position on the ground plane (e.g., field template), and vice-versa. In theory, the homography between the image and ground planes can be determined from the full set of intrinsic and extrinsic camera parameters. However, such an approach is not always practical. As a result, and particularly when the full set of intrinsic and extrinsic camera parameters are not known, step 310 may rely upon various simplifications to facilitate calculation or estimation of the homography between the image plane and the ground plane.

As a first simplification, it is recognized that the players, in many sports, generally remain on the ground plane throughout the game. In other words, the height of any point in the scene, relative to the ground, is relatively inconsequential. Thus, rather than requiring the full camera parameters at each point in time (to enable determination of 3-D homography information), one can merely use 2D homography information to switch between the playing field and the image plan. Finding 2D field-to-image-plane homography is significantly simpler than obtaining the full camera parameter matrix at each point in time, thus significantly simplifying the process of determining, at step 310, an initial estimate of homography between the image plane and the ground plane.

As a second simplification, most frames of video of sporting events have a relatively wide field-of-view such that a minimum number of keypoints and dense features will be in each frame of the video. This is particularly true when the keypoints are distributed throughout the playing field. Each of the keypoints and dense features has a known position within the ground plane (as reflect in a field template) and is therefore usable in determining homography between the image plane and the ground plane. In part because of the presence of these keypoints and dense features, the homography between the image plane and the ground plane can be determined without requiring additional field or camera instrumentation. Thus, in some implementations, the homography between the image plane and the ground plane can be determined solely from the broadcast footage and a template of keypoints and dense features on the playing field.

In general, the field-to-image-plane homography may have 8 degrees of freedom (e.g., 9 unknowns with a common scale factor). As a result, at least 4 identified and located keypoints may be needed to determine the initial estimation of homography between the image frame t and ground plane, at step 310. In some implementations, more than 4 keypoints are visible and identified in the image frame t, which may serve to increase the accuracy of the determined homography. In various implementations, it may be desired to identify approximately 10, 15, 20, or 25 keypoints visible in the image frame t. In general, it may be possible to obtain greater levels of accuracy in the determined homography when the camera has a relatively wide field-of-view (e.g., as an increased field-of-view may include a greater number of keypoints and identifying a greater number of keypoints may result in higher accuracy in the determined homography). Additionally, it may be possible to obtain greater levels of accuracy in the determined homography when the camera is relatively high above the ground plane (e.g., as a higher point-of-view generally results in a smaller difference between the image and ground planes, or a smaller homographic transformation overall, and smaller transformations may be easier to compute with high levels of accuracy).

In some implementations, at step 312, the quality of the initial estimation of homography determined in step 310 is checked in a self-verification process. The self-verification process checks the goodness of the initial estimation of homography. The self-verification process decides if online optimization (step 314) is needed or whether the initial estimation of homography should be accepted. In some implementations, the self-verification process of step 312 involves two or more independent checks, each of which must be satisfied to in order to skip online optimization in step 314.

The first check of the self-verification process of step 312 may involve assessing the number and spatial distribution of the identified and located keypoints $P_t$ for the image frame t. In general, the first check is focused on whether there are a sufficient number of identified and located keypoints $P_t$ visible in the image frame t and whether those keypoints are adequately distributed across the image frame t. A low number of identified and located keypoints $P_t$ visible in the image frame t, or a lack of sufficient spatial distribution of the keypoints across the image frame t suggests that the initial estimation of homography cannot be relied upon. In one implementation of the first check of the self-verification process of step 312, the image frame t is divided into zones at three resolutions: 2×2, 4×4, and 8×8, which zones may be weighted as further described below. In one such implementation, the image frame t may be divided into 2×2 zone, each 2×2 zone may be further divided into 2×2 subzones (corresponding to the 4×4 zones), and each subzone may be further divided into 2×2 sub-subzones (corresponding to the 8×8 zones). It should be appreciated that other resolutions and other combinations of resolutions may be used.

A reliability score may then be determined by counting the number of zones that include at least one identified and located keypoint $P_t$ and, optionally, weighting that count by zone size. As an example, zones at the 2×2 resolution may be weighted by a factor of 4, zones at the 4×4 resolution may be weighted by a factor of 2, and zones at the 8×8 resolution may be weighed by a factor of 1. In such arrangements, the presence of at least one identified and located keypoint $P_t$ in a zone at the 2×2 resolution contributes 4 points to the reliability score, the presence of at least one identified and located keypoint $P_t$ in a zone at the 4×4 resolution contributes just 2 points to the reliability score, and the presence of at least one identified and located keypoint $P_t$ in a zone at the 8×8 resolution contributes 1 point to the reliability score. Thus, the maximum possible reliability score of 112 occurs when there is at least one identified and located keypoint $P_t$ in each 2×2 zone (e.g., 4 zones, each weighted by 4, contributing a maximum of 16 points), each 4×4 zone (e.g., 16 zones, each weighted by 2, contributing a maximum of 32 points), and each 8×8 zones (e.g., 64 zones, each weighted by 1, contributing a maximum of 64 points). It should be appreciated that other weightings and combinations of weightings, leading to different maximums of the possible reliability score may be used. In general, the first check of the self-verification process of step 312 is satisfied only when the reliability score meets or exceeds a threshold. The threshold reliability score to satisfy the first check of the self-verification process of step 312 may be scaled based on the maximum possible reliability score. As an example, the threshold reliability score may be a reliability score of at least 75%, at least 80%, at least 85%, at least 90%, or at least 95% of the maximum possible reliability score. In the example of quad-weighted 2×2 zones, double-weighted 4×4 zones, and single-weighted 8×8 zones, the threshold reliability score may be a reliability score of at least 80, at least 85, at least 90, at least 95, at least 100, or at least 105.

The second check of the self-verification process of step 312 may involve assessing consistency between the initial estimation of homography $H_t$ for the image frame t determined in step 310 and determined homography $H_{t-1}$ for a neighboring image frame. In some embodiments, the neighboring image frame may precede or follow the image frame t by no more than 1 second of video playtime. In some embodiments, the neighboring image frame immediately precedes or immediately follows the image frame t (i.e., there are no intervening image frames). (The "$_{t-1}$" in "$H_{t-1}$" is not intended as limiting the neighboring image frame to the frame immediately preceding frame t.) The second check ensures that any changes in homography between neighboring image frames is relatively small, which reflects the fact that the homography is unlikely to drastically change between neighboring image frames (excepting perhaps cuts from one camera to another).

Consistency between the initial estimation of homography $H_t$ for the image frame t determined in step 310 and determined homography $H_{t-1}$ for the neighboring image frame may be determined, in some implementations, via an intersection-over-union analysis. As an example, consistency between the homography $H_t$ and the homography $H_{t-1}$ may be determined by projecting a binary mask with the homography $H_t$, projecting the same binary mask with the homography $H_{t-1}$, and measuring the overlap of the two projections. In general, the second check of the self-verification process of step 312 is satisfied only when overlap of the two projections meets or exceeds a threshold. Examples of suitable thresholds for the overlap of the two projections include an overlap of at least 0.2, at least 0.3, at least 0.4, at least 0.5, at least 0.6, at least 0.7, at least 0.8, at least or 0.9. In one particular embodiment, the second check of the self-verification process of step 312 is satisfied only when the overlap is at least 0.5.

When both checks the self-verification process of step 312 are satisfied, the initial estimation of homography $H_t$ is taken as the proper homography for the image frame t and output, stored, or otherwise utilized at step 316. When at least one of the checks the self-verification process of step 312 are not satisfied, the flow moves to online optimization (step 314)

In step 314, an online optimization process is performed that uses the dense features $D_t$ that are visible within the image frame t (and were identified in step 304) to compute a second estimation of homography $H_t$ for the image frame t. In some embodiments, the computation of homography in step 314 is done without utilizing the keypoints $P_t$ that are visible within the image frame t (e.g., without using the initial estimation of homography from step 310). The homography estimation in step 314 may, in some implementations, be an optimization exercise involving minimization of the weighted sum of matching loss $L_f$ and tracking loss $L_s$. As an example, step 314 may involve estimation of homography $H_t$ for the image frame t via equation 1.

$$H_t = \underset{H}{\mathrm{argmax}}\, \lambda_f L_f(D_t, W(H, F)) + \lambda_s L_s(D_t, W(HH_{t-1}^{-1}, D_{t-1})) \quad (1)$$

Figure 6:
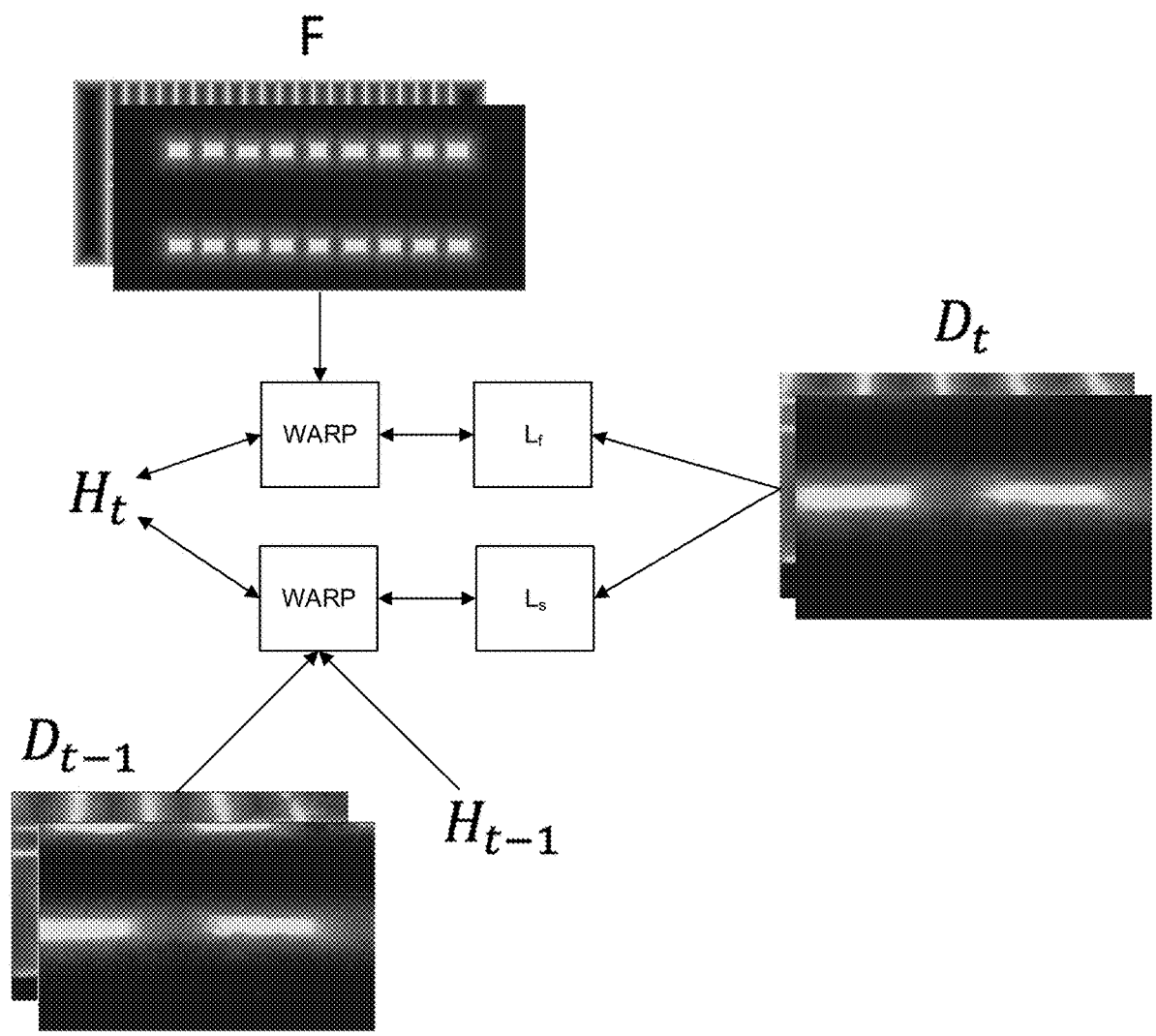
FIG. 6 is a flowchart illustrating operation of a particular class of implementations of refining homography estimations enabled by the present disclosure.

In equation 1, the matching loss function ($L_f$) computes the differences between the dense features $D_t$ for image frame t and the warped field features (e.g., the corresponding features F from the field template, warped by the current estimation of the homography H). Equation 1 thus encourages the estimate homography H to align the dense features $D_t$ for image frame t with ground truth features (e.g., the positions of those features indicated via the field template). Meanwhile, the tracking loss function (La) computes the difference between $D_t$ and $D_{t-1}$ (i.e., dense features for a neighboring frame), with $D_{t-1}$ being warped using the relative homography $HH_{t-1}^{-1}$ (e.g., warped using the inverse of the homography for a neighboring frame and warped using the homography for current frame t). The tracking loss function ($L_s$) thereby encourages consistency of dense features between neighboring frames. W may be warping operation based on differentiable bi-linear sampling. An L2 loss function, or least square errors, may be used for both the matching loss and the tracking loss. If desired, an L1 loss function, or least absolute deviations, may be used. $\lambda_f$ and $\lambda_s$ are weights for the matching loss and tracking loss functions, respectively. In at least one embodiment, $\lambda_f$ is set to 0.9 and $\lambda_s$ is set to 0.1. A visualization of the estimation of homography $H_t$ for the image frame t via equation 1 is shown in FIG. 6, where the arrowheads indicate the directionality of information flows.

In some embodiments, the operations of FIG. 3 may be repeated for one, some, or even all of the frames in a video presentation. Determining homography for multiple frames, particular changes in the homography over time, also enables recreation of the 3D location of the camera over time.

Figure 7:
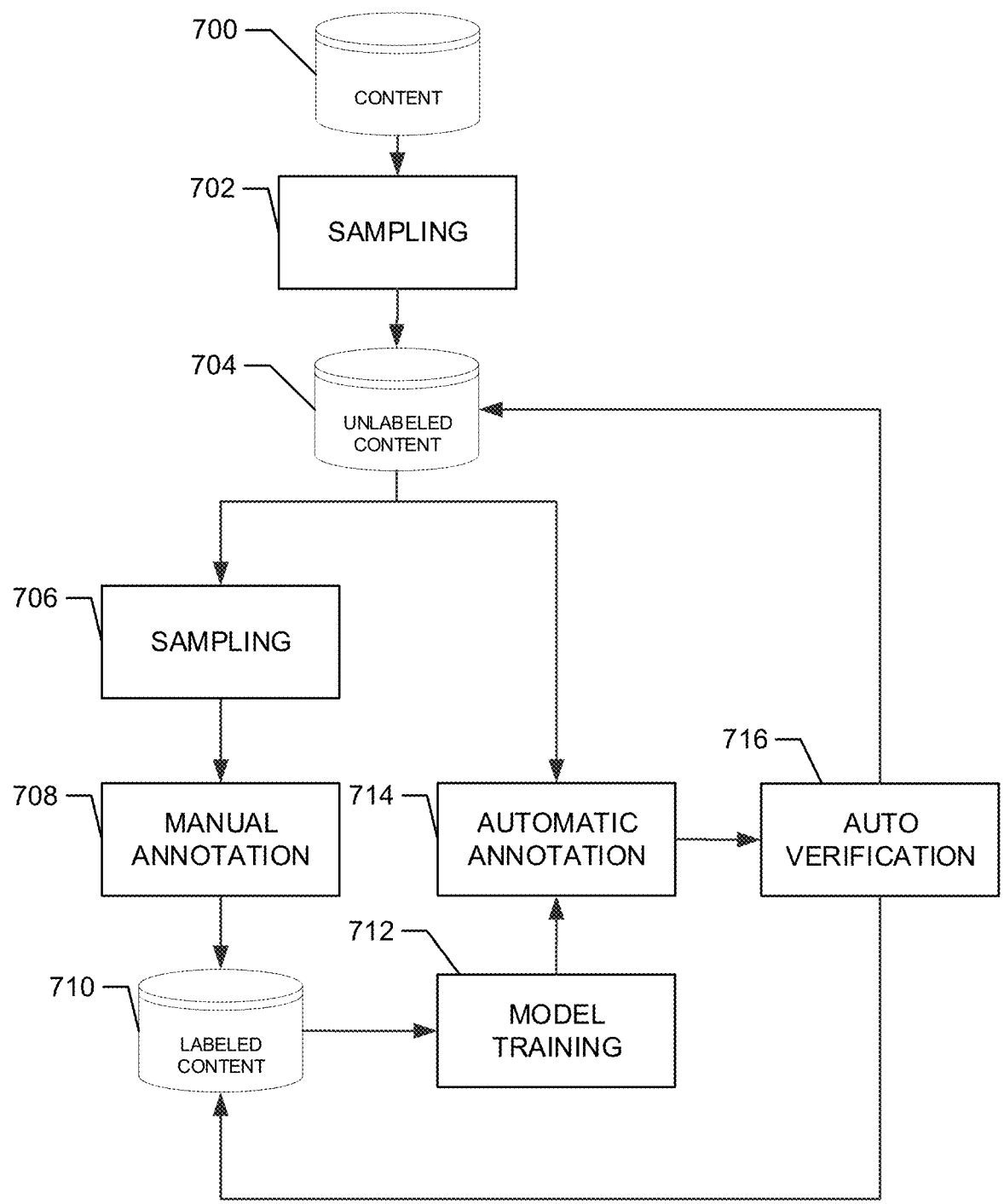
FIG. 7 is a flowchart illustrating operation of a particular class of implementations of semi-automated keypoint annotation enabled by the present disclosure.

As noted in connection with step 304, detection of keypoints and dense features within an image frame t may be accomplished via an algorithm employing machine learning (e.g., an artificial neural network). FIG. 7 illustrates a flowchart for training such an algorithm to automatically identify and locate keypoints $P_t$ and dense features $D_t$ that are visible within the image frame t. In some embodiments, separate algorithms are trained for different types of sports, which have different field templates (e.g., different arrangements of keypoints and dense features). In some embodiments, separate algorithms may be trained for different teams or different playing fields. As an example, there is significant variation in the size and shape of baseball playing fields, even within the professional leagues, and thus is may be desirable, or even necessary, in certain situations for an algorithm to be specifically trained for a specific playing field (i.e., a field template specific to that individual playing field)

At step 702, a sampling of videos are retrieved from content 700. Content 700 may include sports broadcasts and videos available to the practitioner. The videos may be sampled uniformly, randomly, or via some particular logic. As an example, video metadata or other information may be used to select videos covering large environmental variations (e.g., different teams, fields, weathers, and seasons). Selecting videos that cover large environmental variations may generally improve the efficacy of the algorithm's training (e.g., reducing the amount of manual annotation needed to achieve a given level of performance in the trained task). The sampled videos are added to unlabeled content database 704.

At step 706, a sampling of video frames are retrieved from the videos in unlabeled content database 704. The sampling of step 706 may be uniform, random, or via some particular logic. As an example, the sampling of step 706 may select video frames that reflect significant variation (e.g., if a set of multiple samples video frames are too similar, only one or a subset of those video frames is selected in step 706). The remaining video frames are left within the unlabeled content database 704.

At step 708, each video frame selected in step 706 is manually annotated to identify visible keypoints and dense features and to identify correspondences to keypoints and dense features in a field template. As an example, an operator may be presented with a selected image frame along with the field template. The operator may be asked to mark the locations of some (e.g., a minimum number of) or all visible keypoints and/or visible dense features within a particular image frame as well as mark or otherwise identify the corresponding keypoints and/or dense features on the field template. In some embodiments, four identified keypoints or dense features are enough to estimate homography, if any three points are not co-linear. However, more identified keypoints or dense features are usually needed in order to get a better estimation of the homography, particularly given inaccuracies in the manual annotation process. The operator may be asked to repeat that task for all of the image frames selected in step 706. The manually labeled image frames may then be added to labeled content database 710.

At step 712, the labeled content database 710 is used in training an algorithm to automatically identify and locate keypoints $P_t$ and dense features $D_t$ that are visible within image frames.

At step 714, the trained model is tested on the remaining unlabeled content database 704. In particular, the trained model is tasked with generating pseudo labels (e.g., identifications and locations of keypoints $P_t$ and dense features $D_t$ visible within the image frames). The pseudo labels are then subjected to an automatic verification process in step 716.

At step 716, the reliability of the automatically-generated pseudo labels is determined. In some embodiments, step 716 involves classifying each automatically-generated pseudo label as either a good annotation or a bad annotation. Good annotations may be directly added to the labeled content database 710 for training the algorithm in a future iteration. Bad annotations may be added back to the unlabeled content database 704 and/or flagged for manual annotation. In other words, bad annotations may be automatically selected for manual annotation 708 in a subsequent iteration of training. Bad annotations may also refer to uncertain annotations.

In some embodiments, auto verification step 716 involves, for each frame $I_t$, obtaining an estimate of the homography $H_t$ for the image frame. The estimate of the homography $H_t$ may be based on labeled keypoints and/or visible dense features (e.g., labeled content 710) associated with that image frame $I_t$. The quality or goodness of labeled keypoints and/or visible dense features is then determined based on the distance between each labeled point $P_t$ (e.g., collectively representing the labeled dense features and/or keypoints) and the position of the corresponding warped feature (e.g., the corresponding feature in the field template following warping with the estimated homography), using, as an example, equation 2.

$$L=\|P_t-\mathrm{Warp}(H_t,F)\|_1 \qquad (2)$$

The distance of equation 2 may be measured by the vectorized L1 loss (e.g., least absolute deviations). When the distance for a particular labeled point is above a high threshold $T_h$, the estimation is sent back to unlabeled content database 704 for manual annotation or automatic annotation after further training. When the distance for a particular labeled point is below a low threshold Ti (e.g., which is lower than the high threshold $T_h$), the estimation is accepted, added to labeled content database 710, and, if desired, used for training in the next iteration.

In some other embodiments, the auto verification step 716 may involve an estimation of uncertainty of the keypoint predictions. In some embodiments, an estimation of the keypoint prediction's uncertainty may be obtained using an ensemble of different learning algorithms. The uncertainty can be measured via the variance of predictions from the learning algorithms in the ensemble. The ensemble can be generated by applying dropout to different parameters of the same trained network. Alternatively or additionally, the ensemble can be formed of learning algorithms with different architectures and training parameters. In some embodiments, an ensemble is utilized in step 716 that includes (1) the direct regressed homography parameters from the learning algorithm being trained and (2) the estimated homography from keypoint and dense features correspondences which are predicted by the same learning algorithm. In some embodiments, the Euclidean distance between the regressed homography matrix and the keypoint-estimated homography matrix is used as an indicator of the uncertainty in a pseudo label. In such embodiments, the automatically-generated pseudo labels where the Euclidean distance between the regressed homography matrix and the keypoint-estimated homography matrix is above a first threshold are marked as bad annotations. In contrast, the automatically-generated pseudo labels where the Euclidean distance between the regressed homography matrix and the keypoint-estimated homography matrix is below a second threshold are marked as good annotations. In some embodiments, the first and second thresholds are identical. In some other embodiments, the second threshold is less than the first threshold and results between the first and second threshold are considered uncertain and returned to the unlabeled content database 704.

The steps of FIG. 7 may be iterated until the algorithm being trained is sufficiently trained (for the desired field template). As an example, the steps of FIG. 7 may be repeated until all of the content originally placed into unlabeled content 704 is either manually annotated or automatically annotated (with annotations that have verified as a good annotations). As another example, the steps of FIG. 7 may be repeated until samplings of the automatic annotations show an accuracy greater than some desired threshold. As a particular example, the steps of FIG. 7 may be repeated until manually-reviewed samplings of the automatic annotations show that at least 95% of the automatic annotations are correct.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, comprising:
    obtaining video of a sports game on a playing field, wherein the video is characterized by an image plane;
    obtaining a top-down template of the playing field, wherein the top-down template includes a plurality of keypoints and a plurality of dense features associated with the playing field and wherein the playing field corresponds to a ground plane;
    identifying, with one or more processors and memory, keypoints visible in a first frame of the video by matching at least some of the keypoints visible in the first frame to corresponding keypoints in the top-down template;
    identifying, with one or more processors and memory, dense features visible in the first frame of the video by matching at least some of the dense features visible in the first frame to corresponding dense features in the top-down template;
    based on the identified keypoints in the first frame, obtaining a first estimate of homographic transformation parameters for the first frame representing transformation between the image plane and the ground plane;
    determining that a reliability of the first estimate of the homographic transformation parameters for the first frame is below a predetermined threshold;
    based on determining that the reliability of the first estimate of the homographic transformation parameters for the first frame is below the predetermined threshold, obtaining a second estimate, based on the identified dense features for the first frame, of the homographic transformation parameters for the first frame;
    obtaining homographic transformation parameters for a second frame of the video, wherein the homographic transformation parameters for the second frame represent a transformation between the image plane and the ground plane for the second frame and wherein the second frame precedes or follows the first frame by no more than 1 second of video playtime;
    obtaining dense features associated with the second frame; and
    generating a refined estimate of the homographic transformation parameters for the first frame based on (1) the second estimate of the homographic transformation parameters for the first frame, (2) the homographic transformation parameters for the second frame of the video, and (3) the dense features associated with the second frame.

2. The method of claim 1, wherein the keypoints are uniformly dispersed across the top-down template and wherein the dense features comprise (a) line markings on the playing field and (b) distinctive regions on the playing field.

3. The method of claim 1, wherein the second frame immediately precedes or immediately follows the first frame.

4. The method of claim 1, wherein the first frame is divided into a plurality of non-overlapping first zones and wherein each of the first zones is divided into a plurality of non-overlapping second zones, the method further comprising:
    determining the number of first zones that include at least one identified keypoint;
    determining the number of second zones that include at least one identified keypoint; and
    determining a weighted summed by summing the number of first zones that include at least one identified keypoint multiplied by a first weighting factor together with the number of second zones that include at least one identified keypoint multiplied by a second weighting factor, wherein the first weighting factor is greater than the second weighting factor, and wherein determining that the reliability of the first estimate of the homographic transformation parameters for the first frame is below the predetermined threshold comprises determining that the weighted sum is below the predetermined threshold or lower than an additional predetermined threshold.

5. The method of claim 1, wherein determining that the reliability of the first estimate of the homographic transformation parameters for the first frame is below the predetermined threshold comprises determining that an intersection-over-union of a first projection and a second projection is lower than the predetermined threshold or lower than an additional predetermined threshold, where the first projection is based on the first estimate of the homographic transformation parameters for the first frame and wherein the second projection is based on the homographic transformation parameters associated with the second frame.

6. A method, comprising:
    obtaining video of a sports game on a playing field, wherein the video is characterized by an image plane;
    obtaining a top-down template of the playing field, wherein the top-down template includes a plurality of dense features associated with the playing field and wherein the playing field corresponds to a ground plane;

identifying, with one or more processors and memory, dense features visible in a first frame of the video by matching at least some of the dense features visible in the first frame to corresponding dense features in the top-down template;

determining, based on the identified dense features in the first frame, a first estimate of homographic transformation parameters for the first frame, the homographic transformation parameters representing transformation between the image plane and the ground plane;

obtaining additional homographic transformation parameters, the additional homographic transformation parameters representing transformation between the image plane and the ground plane for a second frame of the video and wherein the second frame precedes or follows the first frame by no more than 1 second of video playtime;

obtaining dense features associated with the second frame; and refining the first estimate of the homographic transformation parameters for the first frame into a refined estimate of the homographic transformation parameters for the first frame based on (1) the first estimate of the homographic transformation parameters for the first frame, (2) the additional homographic transformation parameters associated with the second frame, and (3) the dense features associated with the second frame.

7. The method of claim 6, wherein the dense features comprise (a) line markings on the playing field and (b) distinctive regions on the playing field.

8. The method of claim 6, wherein the top-down template further includes a plurality of keypoints associated with the playing field, the method further comprising:

with the one or more processors and memory, identifying keypoints visible in a first frame of the video by matching at least some of the keypoints visible in the first frame to corresponding keypoints in the top-down template; and based on the identified keypoints in the first frame, obtaining a second estimate of homographic transformation parameters for the first frame representing transformation between the image plane and the ground plane.

9. The method of claim 8, wherein the keypoints are uniformly dispersed across the top-down template and wherein the dense features comprise (a) line markings on the playing field and (b) distinctive regions on the playing field.

10. The method of claim 9, wherein the playing field comprises an American football field, wherein the line markings comprise at least (a) hash marks that mark off one yard increments, (b) inbound lines that mark the boundary of the playing field, and (c) yard lines that mark off five yard increments, and wherein the distinctive regions comprise (i) numerals that display the distance from the closest goal line in multiples of ten and (ii) arrows adjacent to the numerals to indicate direction to the closest goal line.

11. The method of claim 8, further comprising:

determining that a reliability of the second estimate of the homographic transformation parameters for the first frame is below a predetermined threshold; and based on determining that the reliability of the second estimate of the homographic transformation parameters for the first frame is below the predetermined threshold, providing an indication that the refined estimate is preferred over the second estimate.

12. The method of claim 8, further comprising:

determining that a reliability of the second estimate of the homographic transformation parameters for the first frame is above a predetermined threshold; and based on determining that the reliability of the second estimate of the homographic transformation parameters for the first frame is above the predetermined threshold, providing an indication that the second estimate is preferred over the refined estimate.

13. The method of claim 12, wherein the first frame is divided into a plurality of non-overlapping first zones, each of the first zones is divided into a plurality of non-overlapping second zones, and wherein determining that the reliability of the second estimate of the homographic transformation parameters for the first frame is above the predetermined threshold comprises:

determining the number of first zones that include at least one identified keypoint;

determining the number second zones that include at least one identified keypoint;

determining a weighted summed by summing the number of first zones that include at least one identified keypoint multiplied by a first weighting factor together with the number of second zones that include at least one identified keypoint multiplied by a second weighting factor, wherein the first weighting factor is greater than the second weighting factor; and determining that the weighted sum is above the predetermined threshold or above an additional predetermined threshold.

14. The method of claim 13, wherein determining that the reliability of the second estimate of the homographic transformation parameters for the first frame is above the predetermined threshold comprises:

determining that an intersection-over-union of a first projection and a second projection is at least 0.5, where the first projection is based on the second estimate of the homographic transformation parameters for the first frame and wherein the second projection is based on the additional homographic transformation parameters associated with the second frame.

15. The method of claim 6, wherein the second frame immediately precedes or immediately follows the first frame.

16. A system, comprising one or more processors and memory configured to:

obtain a video presentation of a live event, wherein the live event includes participants at a venue and wherein the video presentation is captured by a camera with a lens that lies in an image plane;

obtain a template of the venue, wherein the template includes virtual markings that present real markings on the venue and wherein the venue lies in a ground plane;

estimate, using a machine learning tool, first homography parameters representing homographic transformation between the image plane and the ground plane based on the video presentation and the template of the venue;

match, using the machine learning tool, a plurality of real markings in a frame of the video presentation to a corresponding plurality of virtual markings in the template of the venue;

determine, based on the matched markings, second homography parameters representing the homographic transformation between the image plane and the ground plane;

determine that the first homography parameters differ from the second homography parameters by at least a threshold; and based on determining that the first homography parameters differ from the second homography parameters by at least the threshold, soliciting corrective input from at least one user, where such corrective input indicates locations of the real markings within the frame.

17. The system of claim 16, wherein the processors and memory are further configured to determine that the first homography parameters differ from the second homography parameters by at least the threshold by determining a Euclidean distance between the first homography parameters and the second homography parameters is above the threshold.

18. The system of claim 16, wherein the processors and memory are further configured to:
train the machine learning tool to identify and locate real markings within frames of video presentations by:
selecting a subset of image frames from the video presentation, wherein the subset includes a plurality of image frames;
receiving user input, for each image frame in the subset, that manually matches at least some real markings within the image frame to corresponding virtual markings in the template of the venue;
adding information about the manually identified real markings to a labeled dataset; and
use the labeled dataset in training the machine learning tool.

* * * * *